(12) United States Patent
Feldman et al.

(10) Patent No.: US 7,827,079 B2
(45) Date of Patent: Nov. 2, 2010

(54) METHOD AND SYSTEM FOR ASSESSING AND REPORTING VAT CHARGES FOR NETWORK-BASED MARKETPLACE SERVICES

(75) Inventors: Yuliya Feldman, Campbell, CA (US); Peter Johnson, Santa Cruz, CA (US); Samuel Au, Santa Clara, CA (US); Sandeep Bhalla, San Jose, CA (US); Shio-Hsien Hubert Tai, Milpitas, CA (US); Mohana Fulay, Cupertino, CA (US); Zhenyin Yang, San Jose, CA (US)

(73) Assignee: eBay Inc., San Jose, CA (US)

( * ) Notice: Subject to any disclaimer, the term of this patent is extended or adjusted under 35 U.S.C. 154(b) by 1249 days.

(21) Appl. No.: 10/610,125

(22) Filed: Jun. 30, 2003

(65) Prior Publication Data

US 2004/0267620 A1 Dec. 30, 2004

(51) Int. Cl.
*G06F 17/22* (2006.01)
*G06Q 20/00* (2006.01)
(52) U.S. Cl. .......................................... 705/31; 705/19
(58) Field of Classification Search .................... 705/31
See application file for complete search history.

(56) References Cited

U.S. PATENT DOCUMENTS

| | | | |
|---|---|---|---|
| 5,335,169 A | 8/1994 | Chong | |
| 5,774,872 A | 6/1998 | Golden et al. | |
| 5,875,433 A | 2/1999 | Francisco et al. | |
| 6,003,016 A * | 12/1999 | Hagemier | 705/19 |
| 2003/0105687 A1* | 6/2003 | Bross et al. | 705/31 |
| 2004/0068452 A1* | 4/2004 | Ullrich et al. | 705/35 |
| 2004/0122747 A1* | 6/2004 | Jimenez et al. | 705/27 |

FOREIGN PATENT DOCUMENTS

| | | | |
|---|---|---|---|
| WO | WO-2005003923 A2 | 1/2005 | |
| WO | WO-2005003923 A3 | 1/2005 | |

\* cited by examiner

*Primary Examiner*—F. Ryan Zeender
*Assistant Examiner*—Faris Almatrahi
(74) *Attorney, Agent, or Firm*—Schwegman, Lundberg & Woessner, P.A.

(57) ABSTRACT

A method and system for assessing VAT on marketing services provided via a network-based marketplace are disclosed. VAT is automatically assesses for users of the services having residences in different countries, at least a portion of which require VAT charges for the services. Corresponding data is stored at individual sites operated by the marketplace service. Periodically, VAT-related data are aggregated for each of the plurality of countries to generate respective tax return reports. VAT is accessed for different users based on the country of residence of the user and whether the user has a VAT-exempt status.

27 Claims, 16 Drawing Sheets

Step 2: Review the fees

Listing fees:

| Insertion fee: | $0.30 |
|---|---|
| Listing Designer: | 0.10 |
| Total listing fee: * | $0.40 |

* Stated fees include 20% VAT for residents of Germany. Learn more how VAT applies to you.

502   504   506

Listing fees are non-refundable. The only exception is the Reserve Price Auction fee, which is refunded automatically if your item sells.

▶ Fees have recently changed. Learn more about fees and credits.

Step 2: Review the fees

▶Note: Fees charged for scheduled listings are those applicable at the actual start time, not when the listings are submitted using the Sell Your Item form.

602

Listing fees:

| Insertion fee: | $0.30 |
|---|---|
| Scheduled start time: | 0.10 |
| Gallery: | 0.25 |
| Total listing fee: * | $0.65 |

If your item sells you will be charged a Final value Fee. This fee is based on a percentage of the final sales price. You may check your current account balance before adding this item.

600

Listing fees are non-refundable. The only exception is the Reserve Price Auction fee, which is refunded automatically if your item sells.

▶ Fees have recently changed. Learn more about fees and credits.

* Stated fees include [VAT rate]% VAT for residents of [Country]. Learn more how VAT applies to you.

*Fig. 6*

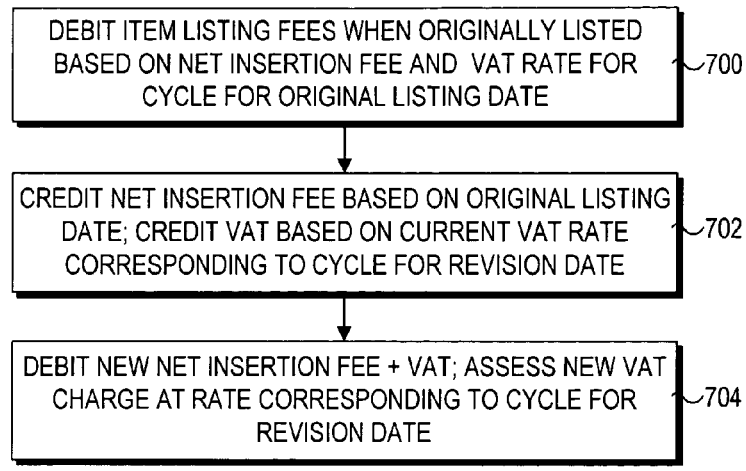

Fig. 7

700 — DEBIT ITEM LISTING FEES WHEN ORIGINALLY LISTED BASED ON NET INSERTION FEE AND VAT RATE FOR CYCLE FOR ORIGINAL LISTING DATE

702 — CREDIT NET INSERTION FEE BASED ON ORIGINAL LISTING DATE; CREDIT VAT BASED ON CURRENT VAT RATE CORRESPONDING TO CYCLE FOR REVISION DATE

704 — DEBIT NEW NET INSERTION FEE + VAT; ASSESS NEW VAT CHARGE AT RATE CORRESPONDING TO CYCLE FOR REVISION DATE

Item 3122439207

| | |
|---|---|
| Insertion fee: | $0.30 |
| Gallery: | $0.25 |
| Listing Fee for item 3122439207: | $0.55 |

| | |
|---|---|
| Total Listing Fee for all items: * | $2.20 |

\* Stated fees include [VAT rate]% VAT for residents of [Country]. Learn more how VAT applies to you.

Final Value Fee: *

If your item is sold, you will be charged a Final Value Fee. This fee is based on a percentage of the final sale price at the end of the auction. For more information, view the Fees and Credits page.

| If the final sale price is: | Your Final Value Fee equals: 802 |
|---|---|
| $25.00 or less | 5.25% of final sale price |
| $25.01 to $1,000.00 | 5.25% of the initial $25.00 ($1.31), plus 2.75% of the final sale price over $25.00 |
| $1,000.01 or more | 5.25% of the initial $25.00 ($1.31), plus 2.75% of the initial $25.00-$1,000.00($26.82), plus 1.50% of the final sale price over $1,000.00 |

\* Stated fees include [VAT rate]% VAT for [Country] residents. Details about VAT vary. Learn more.

800   804   Fig. 8   806

|  |  |  |  |  | 902 | 904 | 906 |  |
|---|---|---|---|---|---|---|---|---|
|  |  |  |  |  |  |  |  | Page 1 of 1 |
|  |  |  |  |  |  |  |  |  |
| 3509286201 | Jul-19-03 10:45:33 PST | Insertion fee | 3312450993 | 20% | -US $3.017241 | -US $3.62 | -US $3.62 |
| 3522883951 | Jul-31-03 23:59:59 PST | Invoice #013103-9303980016 Do not pay. US $3.62 will be deducted from your checking account! |  |  |  |  | -US $3.62 |
| 3547111623 | Aug-02-03 12:44:39 PST | Insertion Fee | 3312450994 | 20% | -US $3.017241 | -US $3.62 | US $7.24 |
| 3547111644 | Aug-03-03 17:28:29 PST | Insertion fee | 33123230993 | -- | -- | -US $3.02 | -US $10.14 |
| 3547111623 | Aug-06-03 12:44:39 PST | Insertion Fee Credit Relisting | 3312450991 | 20% | US $3.017241 | US $3.62 | -US $6.52 |
| 3547111644 | Aug-07-03 17:28:29 PST | Insertion Fee | 3312450992 | 20% | -US $3.017241 | -US $3.62 | -US $10.14 |
| 3549811717 | Aug-08-03 18:59:35 PST | Payment Received - Thank You! |  |  |  | US $2.50 | -US $7.64 |
| 3547111643 | Aug-09-03 17:28:29 PST | Insertion Fee | 3312450994 | 20% | -US $3.017241 | -US $3.62 | -US $11.26 |
| 3547111644 | Aug-10-03 17:28:29 PST | Insertion Fee | 3312450996 | 20% | -US $3.017241 | -US $3.62 | -US $14.88 |
| 3547111643 | Aug-11-03 17:28:29 PST | Promotional credit Thanks for using Visa! |  |  |  | US $5.00 | -US $9.88 |
| 3547111644 | Aug-12-03 17:28:29 PST | Insertion Fee | 3312450998 | 20% | -US $3.017241 | -US $3.62 | -US $13.50 |
| 35471112214 | Aug-13-03 17:28:29 PST | Insertion Fee | 3312450999 | 20% | -US $3.017241 | -US $3.62 | -US $17.12 |
| 3522883952 | Aug-31-03 23:59:59 PST | Invoice #013103-9303980017 Do not pay. US $17.72 will be deducted from your checking account! |  |  |  |  | -US $17.72 |
|  |  | Account Balance |  |  |  |  | -US $17.72 |

* Learn more how VAT applies to you.   Back to top

*Fig. 9*

| | | | | | 902 | 904 906 | |
|---|---|---|---|---|---|---|---|
| 3509286201 | Aug-1-03 10:45:33 PST | Insertion fee | 3522883951 | -- | -US $3.017241 | -- | -US $10.01 |
| 3509286202 | Aug-2-03 10:45:33 PST | Insertion fee | 3522883952 | -- | -US $3.017241 | -- | -US $13.02 |
| 3509286203 | Aug-3-03 10:45:33 PST | Insertion fee | 3522883953 | -- | -US $3.017241 | -- | -US $16.04 |
| 3509286204 | Aug-4-03 10:45:33 PST | Insertion fee | 3522883954 | -- | -US $3.017241 | -- | -US $19.06 |
| 3509286203 | Aug-5-03 10:45:33 PST | VAT credit for July | -- | -- | | 1002 -- US $0.96 | US $18.10 |
| 3509286206 | Aug-6-03 10:45:33 PST | Insertion fee | 1111111111 | -- | -US $3.017241 | -- | -US $21.12 |
| 3509286207 | Aug-6-03 10:45:33 PST | Insertion fee credit - Free listing day | 1111111111 | -- | US $3.017241 | -- | -US $18.10 |
| 3509286208 | Aug-7-03 10:45:33 PST | Insertion fee | 3522883901 | -- | -US $3.017241 | -- | -US $21.12 |
| 3509286210 | Aug-8-03 10:45:33 PST | Payment Received - Thank you | -- | -- | US $2.500000 | -- | -US $18.62 |
| 3509286208 | Aug-9-03 10:45:33 PST | Insertion fee | 3522883902 | -- | -US $3.017241 | -- | -US $21.63 |
| 3509286208 | Aug-10-03 10:45:33 PST | Insertion fee | 3522883903 | -- | -US $3.017241 | -- | -US $24.65 |
| 3509286208 | Aug-11-03 10:45:33 PST | Promotional Credit | | -- | US $5.000000 | -- | -US $19.65 |
| 3509286208 | Aug-12-03 10:45:33 PST | Insertion fee | 3522883904 | -- | -US $3.017241 | -- | -US $22.67 |
| 3509286208 | Aug-13-03 10:45:33 PST | Insertion fee | 3522883905 | -- | -US $3.017241 | -- | -US $25.69 |
| 3522883951 | Aug-31-03 23:59:59 PST | Invoice #013103-9303980016 Do not pay. US $25.68 will be deducted from your checking account! | | | | | -US $25.68 |
| | | Account Balance | | | | | -US $25.68 |

Learn more how VAT applies to you.

1000

*Fig. 10* ebay
The World's Online Marketplace™

Helpful Links

Invoice Detail

Billing Questions

Account Status

Contact Info Update eBay Announcements

--- eBay International AG
Bubenbergplatz 5
3011 Bern Switzerland
Swiss AG VAT Identification Number: 508508 ~1106
EU VAT Identification Number: pending eBay International AG Invoice for Jan-31-03
Activity from 01-Jan thru 30-Jan, PST Steve Okamoto
1740 BLACKFORD LN
SAN JOSE, CA 95125-5305
United States 1108~ Registration number: CH-035.3.023.263-7
Account number: E930398001
Invoice number: 013103-9303980016

Dear Okamotos,
Please find below a summary of your account activity since your last invoice.   1102

Previous amount due: $7.80
Payments and credits: -$5.00

1104

| Fees | Net | Gross |
|---|---|---|
| Vatable fees (includes 16% VAT: $3.20) ~1108 | $20.00 | $23.20 |
| Non-vatable fees ~1110 | $4.75 | $4.75 |
| Total Fees: | $24.75 | $27.95 |

Total Amount Due: US $30.75

Payment Method
eBay Direct Pay

You are currently signed up for Direct Pay. Your invoice amount of -US $91.57 will automatically be deducted from your bank account on file on Feb-20-03 (or the next business day if it falls on a weekend or holiday).

Regards,
eBay International AG

1100

*Fig. 11* eBay International AG
Bubenbergplatz 5
3011 Bern Switzerland
Swiss AG VAT Identification Number: 508508 ~1106
EU VAT Identification Number: pending Steve Okamoto
My Company Name
1740 BLACKFORD LN
SAN JOSE, CA 95125-5305 US
VAT Identification Number: DE1929192929192 ~ 1202
VAT status: exempt ~ 1204 eBay Invoice for Jan-31-03
Activity from 01-Jan thru 30-Jan, PST

1108 ~ Registration number: CH-035.3.023.263-7
Account number: E930398001
Invoice number: 013103-930398001E

1102

Dear Okamotos,
Please find below a summary of your account activity since your last invoice.

1104

| Previous amount due: | $2.80 |
| Payments and credits: | -$5.00 |
| Fees: | $25.93 |
| Total Amount Due: | US $23.73 |

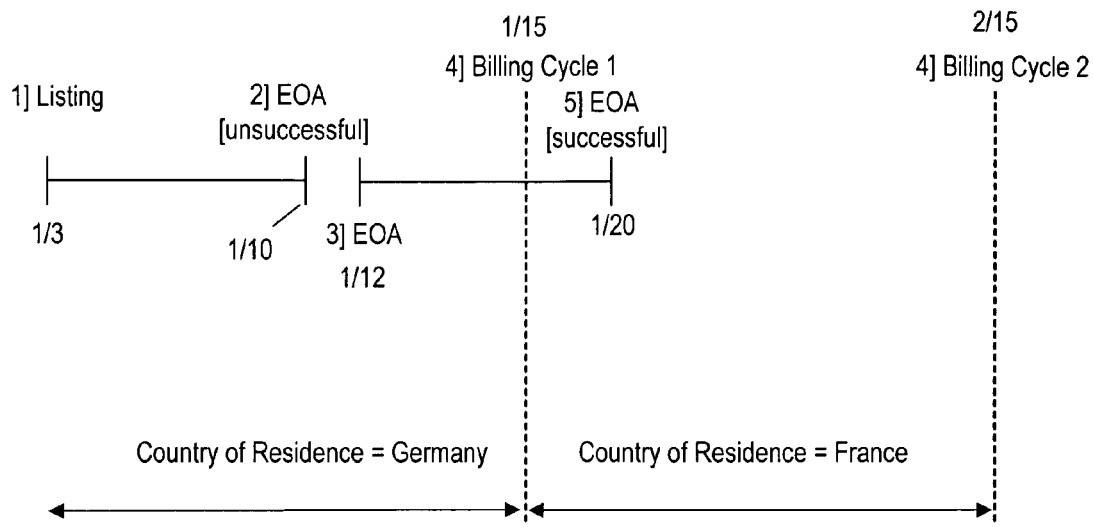

1] 1/3, the Seller listed an item. Insertion Fee of €0.50 (Net) sent to Account Table
2] 1/10, the auction was not successful. No additional charges
3] 1/12, insertion Fee of €0.50 (Net) sent to Account Table
4] 1/15, invoice created
    Total Net = € -1.00
    VAT (16%) = € - 0.16 [German Tax liability]
    Total Due = € -1.16
5] 1/20, the second listing was successful. Credit Insertion Fee [charged in step 3]
    Negative Usage = €0.50
6] 1/30, For invoice created,
    Total Net = €0.50
    VAT (19.6%) = €0.10 [French Tax Liability]
    Total Due = €0.60

*Fig. 14*

METHOD AND SYSTEM FOR ASSESSING AND REPORTING VAT CHARGES FOR NETWORK-BASED MARKETPLACE SERVICES

FIELD OF THE INVENTION

The field of invention relates generally to on-line services and, more specifically but not exclusively relates to a method and system for assessing value-added tax (VAT) for services provided to users of both VAT and non-VAT countries by a network-based marketplace.

BACKGROUND INFORMATION

More and more Internet users are realizing the ease and convenience of buying and selling online by way of person-to-person online trading pioneered by eBay® Inc., San Jose, Calif., the assignee of the present invention. As a result, collectors, hobbyists, small dealers, unique item seekers, bargain hunters, and other consumers are able to buy and sell millions of items at various online trading sites.

Unlike many types of commerce, the Internet has no physical boundaries. This lets anyone around the world trade with others, regardless of the country in which the traders reside (absent restrictions on certain types of trade of for certain countries). While this is advantageous to many, it creates a tax-collection nightmare for many governments.

In particular, taxing authorities (i.e., government entities) in the European Union (EU) rely heavily on a form of tax known as a value-added tax. The VAT is applied to nearly every product purchased by residents of EU countries. In contrast, the VAT is (effectively) not levied on non-EU residence; generally, VAT will be paid by a non-EU resident on an item at the point of purchase, and then refunded when appropriate paperwork is submitted to the taxing authority imposing the VAT.

In addition to products, VAT is also charged on services provided by EU businesses. At the same time, online marketplace sites, such as those hosted by eBay®, derive revenues by offering marketing services to its users. As a result, as of Jul. 1, 2003, the EU has imposed a tax directive requiring online marketplace hosts to collect a VAT for services provided to non-exempt users who reside in EU countries and distribute the collected VAT to the appropriate taxing authorities.

SUMMARY OF THE INVENTION

In accordance with aspects of the present invention a method and system for assessing VAT on marketing services provided via a network-based marketplace are disclosed. VAT is automatically assessed for users of the services having residences in different countries, at least a portion of which require VAT charges for the services. Corresponding data is stored at individual sites operated by the marketplace service. Periodically, VAT-related data are aggregated for each of the plurality of countries to generate respective tax return reports.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5 is a representation of a portion of a web-page form displayed to a user illustrating a note relating to a VAT assessment for fees charged in connection with use of marketing services offered by the network-based marketplace machine;

FIG. 6 is a representation of a portion of a web-page form displayed to a user corresponding to setting up a future listing;

FIG. 7 is a flowchart illustrating operations performed to perform a credit of fees, wherein the debit/credit sequence spans a change in VAT rate for a user;

FIG. 8 is a representation of a portion of a web-page form displayed to a user illustrating final value fees that include a built-in VAT charge and a note identifying an applicable VAT rate;

FIG. 9 is a representation of a portion an exemplary account status page corresponding to a non-exempt EU-registered user;

FIG. 10 is a representation of a portion of an exemplary account status page corresponding to an VAT-exempt EU-registered user;

FIG. 11 is a representation of a portion of an exemplary invoice page corresponding to a non-exempt EU-registered user FIG. 12 is a representation of a portion of an exemplary invoice page corresponding to an VAT-exempt EU-registered user;

FIG. 14 is a schematic diagram illustrating a timeline and corresponding operations related to a user's VAT charges across two billing cycles when a user changes his country of residence;

DETAILED DESCRIPTION OF PREFERRED EMBODIMENTS

Figure 1:
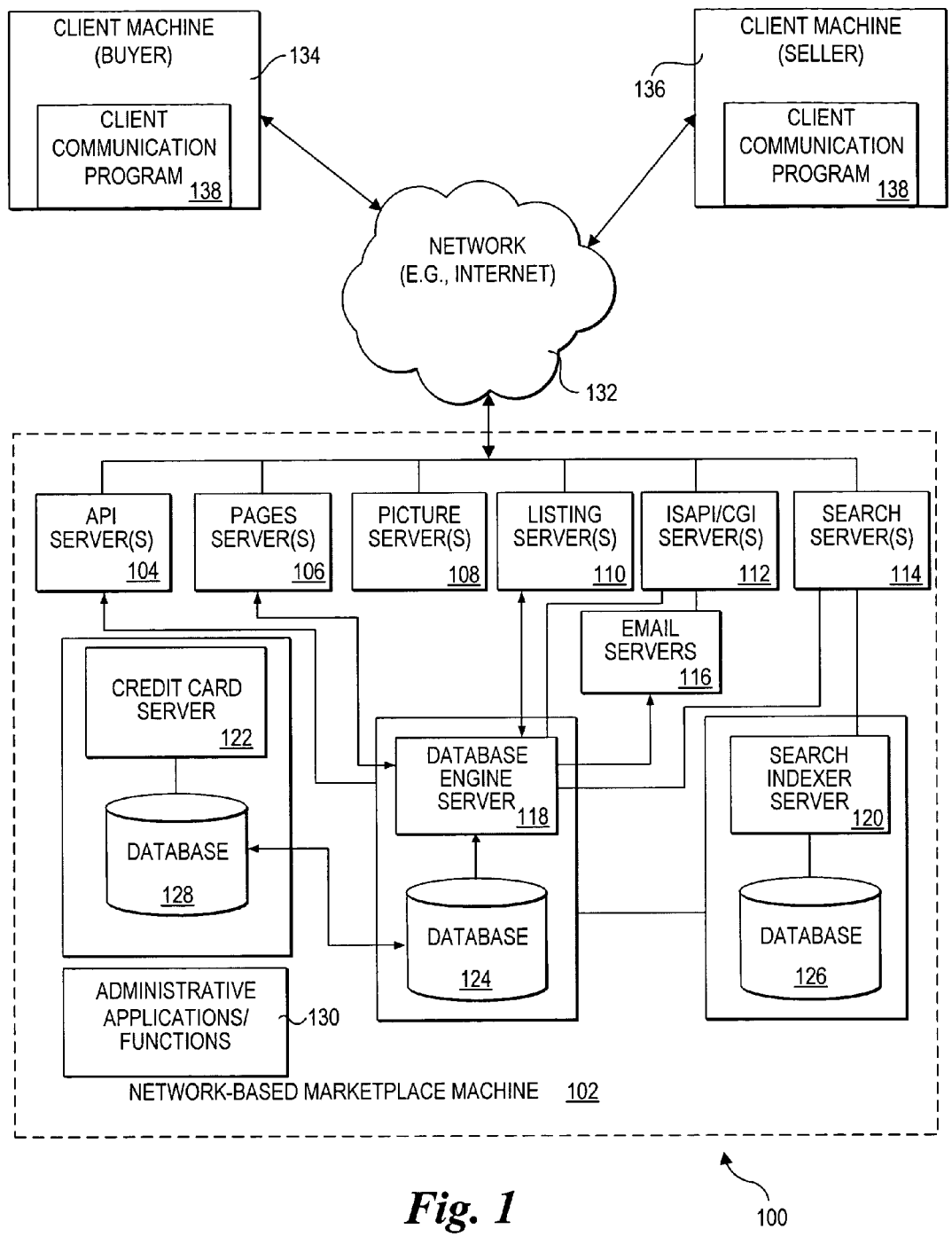
FIG. 1 is a schematic block diagram of a system architecture illustrating software and hardware components of a network-based marketplace machine and exemplary client machines.

Embodiments of method and apparatus for calculating, collecting, reporting and distributing collected value-added taxes in connection with services provided by online marketplace sites are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

TERMINOLOGY/DEFINITIONS

The present invention concerns facilities for the determination, collection, and distribution of value-added taxes imposed for services rendered by online marketplace sites. In order to better understand the principles disclosed herein, the following definitions are provided, wherein:

Value Added Tax (VAT):
  A tax charged on a good or service delivered. VAT referred to herein concerns value added taxes incurred for services rendered ((i.e. the online marketplace service fees to the seller), not the goods traded between seller and buyer.
VAT-registered Sellers (=VAT-exempt):
  The EU directive requires the online marketplace host to handle sellers differently when charging VAT, depending on whether the sellers are VAT-registered businesses in any EU member state or not. VAT-registered sellers whose VAT-ID has been verified and approved by the online marketplace host are termed "VAT-exempt" and are not to be charged VAT.
Non-VAT-registered Sellers (a.k.a. Private Sellers):
  Related to the above, this specification refers to sellers who are not VAT registered as non-VAT registered sellers or also as private sellers.
Local EU Users:
  Country of residence of a seller equals country of the site that is being referred to.
Foreign EU Users:
  Country of residence of a seller in EU but not in the country of the site that is being referred to.
Non-EU Users:
  Country of residence of a seller outside EU (e.g. US, Switzerland, Australia)
Actual Gross:
  Net+VAT of country where seller resides.
Local Gross:
  Net+VAT of country of the site that is being referred to.
Net:
  Amount excluding VAT—this amount is identical for all sellers on a certain site.
Fees:
  All amounts charged to the user directly related to selling activity on the online merchant sites, i.e. insertion fees, final value fees, featured fees, subscription fees (e.g. for selling manager, etc.)
Finance Charges
  Charges to users not related to direct selling activity, but rather to banking processes (e.g. Direct Debit chargebacks, Check return fees, etc).

Network-Based Marketplace Facility

FIG. 1 shows and exemplary architecture 100 implemented by a network-based (i.e., on-line) facility that provides on-line marketplace services to various EU and non-EU users in accordance with one embodiment of the invention. On-line marketplace services are hosted by a network-based marketplace machine 102 that is operated via execution of various software components on corresponding hardware components. The network-based marketplace machine 102 includes one or more of a number of types of front-end servers, namely communications servers in the exemplary form of an application program interface (API) servers 104, page servers 106 that deliver web pages (e.g., markup language documents), picture servers 108 that dynamically deliver images to be displayed within Web pages, listing servers 110, processing servers in the exemplary form of CGI (or ISAPI) servers 112 that provide an intelligent interface to back-end servers, and search servers 114 that handle search requests to the network-based marketplace machine 102. The architecture also includes e-mail servers 116 that provide, inter alia, automated e-mail communications to users of network-based marketplace machine 102.

Data corresponding to service transactions and the like are stored in databases hosted by various back-end servers, including a database engine server 118, a search index server 120 and a credit card database server 122, each of which maintains and facilitates access to a respective database 124, 126, and 128. In addition, various administrative applications and functions performed by network-based marketplace machine 102 are depicted by a block The network-based marketplace machine 102 facilitates on-line trading activities between buyers and sellers via services embodied as an on-line marketplace, such as the on-line marketplace hosted by eBay®. The services are provided via markup language-based pages (e.g., HTML-based Web pages) that are hosted by network-based marketplace machine 102 and served to client machines operated by the various seller and buyer users of the service via a network 132; these client machines are collectively represented by a buyer client machine 134 and a seller client machine 136. The network 132 may be embodied as an Internet, a LAN, a WAN, PSTN, Frame Relay, ATM, satellite communications, wireless communications, combinations thereof, or any other network equipment or protocol that enables electronic communication between the above described network entities.

In addition to other software components that are not illustrated, each of buyer and seller client machines 134 and 136 includes a client communication program 138. The client communication program 138 enables a user to display web pages or e-mail that are loaded from server computers. In one embodiment, client communication program 138 is embodied as a browser (e.g., the Microsoft Internet Explorer browser developed by Microsoft™ Corporation of Redmond, Wash. or the Navigator™ browser developed by Netscape of Mountain View, Calif.). The client communication program 138 executes under an operating system (e.g., Microsoft™ Windows developed by Microsoft™ Corporation or Mac OS X developed by Apple Computers of Cupertino, Calif.) running on a processing core (both not shown). The client communication program 138 may also be embodied as a mail client (e.g., the Microsoft Outlook personal information manager or Lotus Notes™ developed by the Lotus Notes Development Corporation.

Figure 2:
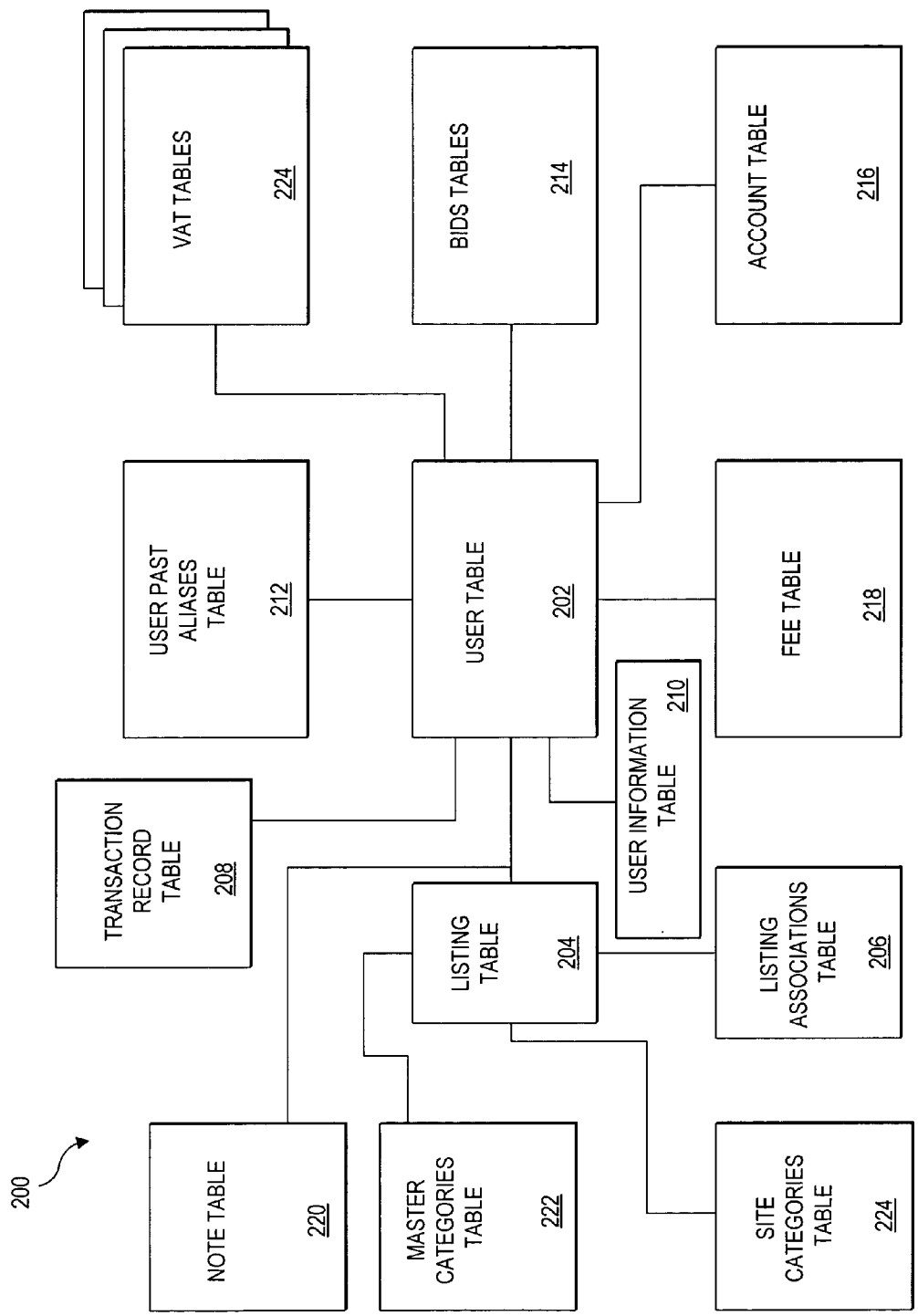
FIG. 2 is a schematic block diagram of a portion of an exemplary database schema employed by the network-based marketplace machine of FIG. 1.

A portion 200 of a database schema implemented by database 124 is shown in FIG. 2. In one embodiment, database 124 may be implemented as a relational database, and includes a number of tables having entries, or records, that are linked by indices and keys. In an alternative embodiment, database 124 may be implemented as a collection of objects in an object oriented database.

Central to database 124 is a user table 202, which contains a record for each user of services provided by network-based marketplace machine 102. The user may operate as a seller, buyer, or both, within the context of the network-based marketplace. Database 124 also includes listings table 204 that may be linked to user table 202 and a listing association table 206. In general, a user record in the user table 202 may be linked to multiple items that are being, or have been, transacted via network-based marketplace machine 14. Recorded transactions are stored in a transaction record table 208. Detailed user information is stored in a user information table 210. A number of other tables are also shown to be linked to the user table 202, namely a user past aliases table 212, a bids table 214, an account table 216, a fee table 218 and a purchase history table 111.

Database 124 may also include a note table 220 populated with note records that may be linked to one or more listing records within listings table 204 and/or to one or more user records within the user table 202. Each note record within the note table 210 may include, inter alia, a comment, description, history or other information pertaining to an item being auctioned via the network-based marketplace machine 102, or to a user of the network-based marketplace machine.

A masters categories table 222 stores records for listing categories presented across multiple views (or presentations) of list categories via regional or community sites presented by the network-based marketplace machine 102. A site categories table 224 stores records indicating which item categories are to be presented for respective regional or community sites (e.g., a country, region or city specific site) presented by the network-based marketplace machine 102.

Figure 3:
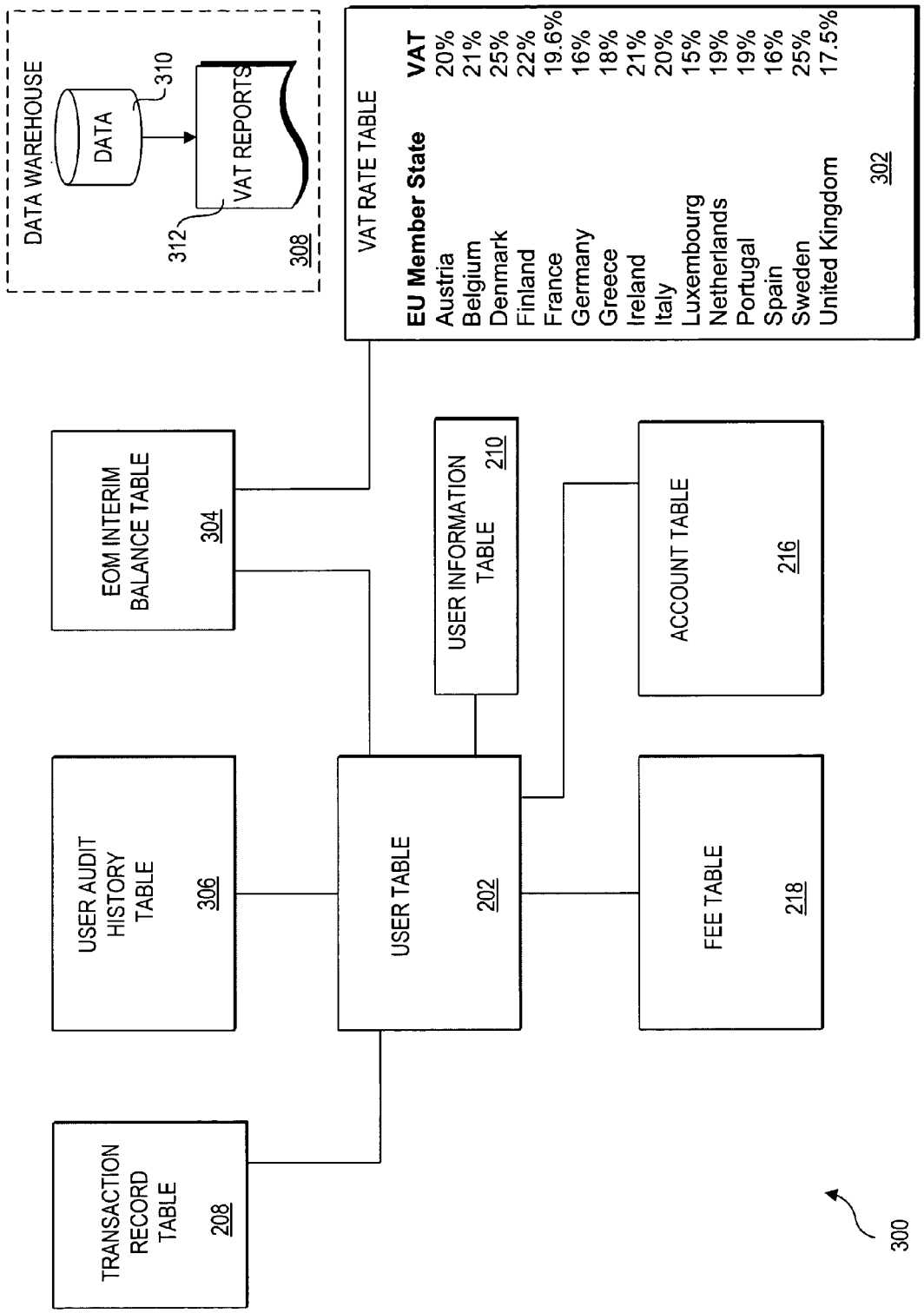
FIG. 3 is a schematic block diagram illustrating further details of the database schema of FIG. 2 relating to value added tax (VAT) operations performed by the network-based marketplace machine of FIG. 1.

In addition to the foregoing tables, database schema 200 also shows a plurality of VAT tables 226. The plurality of tables are employed to generally depict corresponding tables used for VAT-related purposed, including a portion of the tables comprising a portion 300 of the database schema shown in FIG. 3.

In addition to the aforementioned table, database schema portion 300 includes a VAT rate table 302, an EOM (end of month) interim balance table 304. As discussed in further detail below, instances of various tables are copied to a data warehouse 308 and stored in a database 310, whereby VAT reports (i.e., tax returns) 312 may be generated.

VAT rate table stores the VAT rate for services, by EU country, for a given time period. (It is noted that the columns relating to the time period are not shown in FIG. 3 for clarity). For example, the VAT rate varies for different EU countries. Furthermore, the VAT rate for a given country may change over time. Storing the historical VAT rates enables auditing to be performed of transactions that occurred prior to new VAT rates going into effect, and for appropriate VAT rates to be applied for each billing cycle. EOM Interim balance table is used to store VAT-related data corresponding to user activities with the on-line marketplace service.

Rules for VAT Calculation

On-line marketplace services are required to charge VAT to all non-VAT registered sellers residing in an EU member state for their activity on all EU sites. EU resident sellers who are VAT-registered will in fact not be charged VAT, but rather are required to assess the VAT themselves (and pay to their local tax authorities) after having received an invoice from the non-EU supplier (such as eBay®), which invoices a net amount, excluding VAT. All non-EU residents will not be charged VAT for any activity on any marketplace site (including EU sites), no matter whether they are VAT-registered in their country of residence or not. These users are generally not affected by VAT considerations, except for special messaging on Help and Sell your item (SYI) pages of EU sites. These rules are graphically depicted in Table 1 below:

TABLE 1

| Seller Country of Residence | Private Seller | VAT Registered |
| --- | --- | --- |
| EU | Charge VAT | Do not charge VAT |
| Non-EU | Do not charge VAT | |

VAT will be charged on all fees paid for on-line marketplace services (e.g. insertion fees, final value fees, subscription fees). Finance charges are not subject to VAT. All goods and services traded between sellers and buyers on on-line marketplace's sites are not considered herein for VAT purposes.

The VAT rate applicable for each user is determined by the country of residence of the user. For example, a German resident who registers on eBay® with a German address will always be charged German VAT rate even if he is trading on another EU-Website, e.g. http://www.ebay.fr (eBay's France site). The VAT for each user will be assessed at the time of invoice, per the then-current VAT rate for the full invoice cycle (e.g., once a month). Therefore, changes to VAT rates always lead to the activity of the full cycle to be charged per the new VAT rate.

VAT Calculation Data Model

Figure 4:
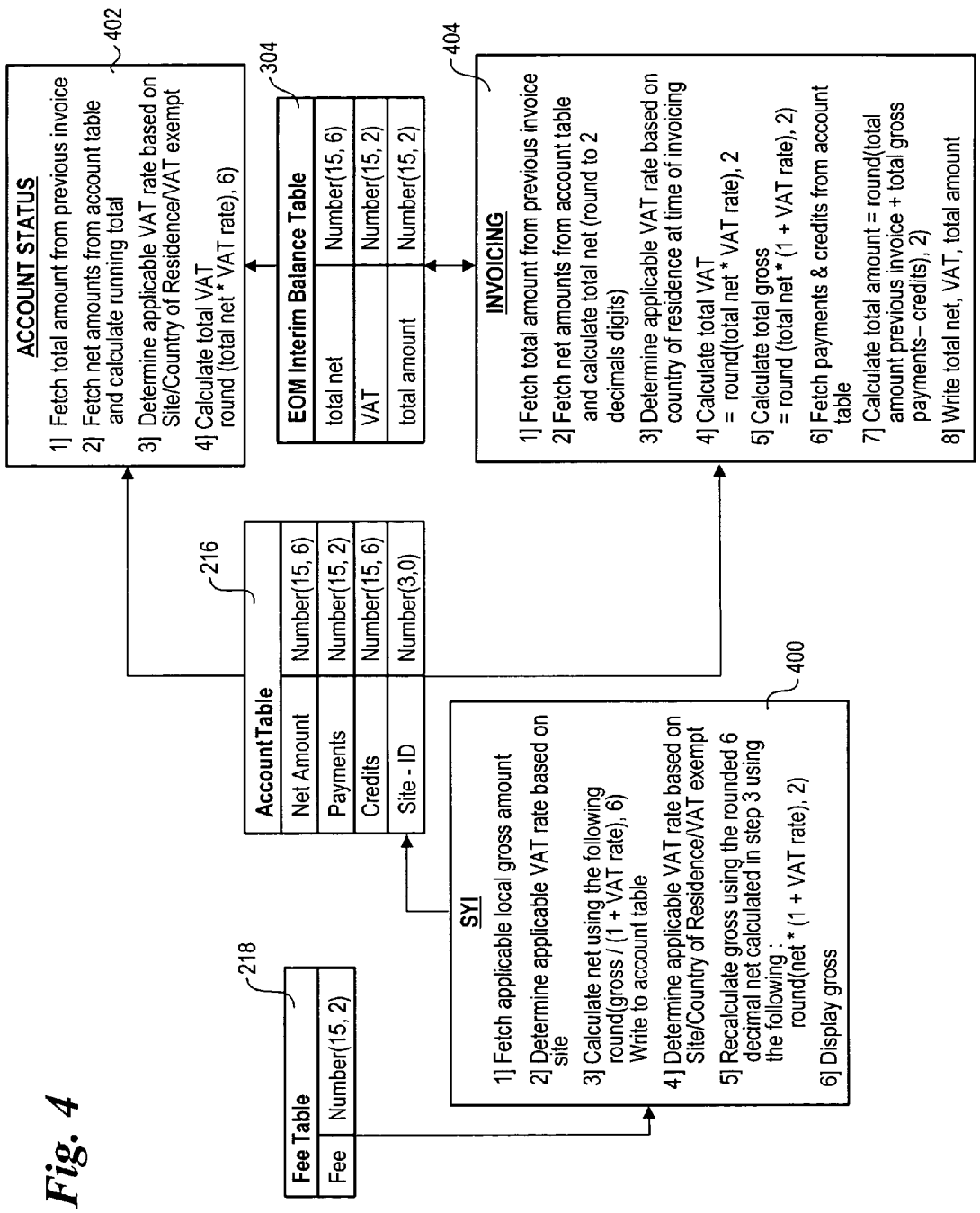
FIG. 4 is a schematic diagram of a VAT assessment model, according to one embodiment of the present invention.

A VAT calculation data model 400 employed for calculating and displaying VAT charges in accordance with a typical listing process is shown in FIG. 4. In accordance with a predetermined fee schedule, a fee for a listing is calculated and stored in Fee table 218. The following operations contained in an SYI block 400 are then performed.

In a first step, the applicable local gross amount of the fee is fetched from Fee table 218. In a second step, the applicable VAT rate based on the site is determined. For example, if the user is using a German site hosted by the on-line marketplaces service, the German VAT rate would apply, and the VAT rate would be retrieved from VAT rate table 302 by querying for the VAT rate applicable for Germany (via, e.g., a corresponding 2-character EU country code). Next, in a step 3 the net is calculated using a formula of:

$$\text{round}(\text{gross}/(1+\text{VAT rate}), 6) \qquad \text{Eq. 1}$$

which produce a 6-decimal net value.

In a step 4, the applicable VAT rate based on a combination of the site, country of residence, and VAT status is determined. This involves determining a VAT status of the user; determining a registration country of the user if the VAT status indicates VAT is applicable to the user; and querying VAT rate table 302 with the user's country code to retrieve the applicable VAT rate.

In a step 5 the gross is recalculated using the rounded 6 decimal net calculated above in step 3 using a formula of $$\text{round}(\text{net}*(1+\textit{VAT}\text{ rate}), 2) \qquad \text{Eq. 2}$$

The recalculated gross amount is then displayed to the user.

The next operations discussed in the model of FIG. 4 concern the steps listed in an account status box 402. First, the total amount owed by the user from the most-recent previous invoice fetched. In a second step, the net amounts from account table 216 are fetched and a running total is calculated. The applicable VAT rate based on a combination of the site, user country of residence, and VAT status is then determined in a step 3. Finally, the total VAT is calculated using the following equation in a step 4:

$$\text{round}(\text{total net} * \text{VAT rate}, 6) \quad \text{Eq. 3}$$

The final set of operations corresponding to the model are shown in a block 404, which concerns invoicing. In a first step, the total amount from the most-recent previous invoice is fetched. In a step 2, the net amounts from account table 216 is fetched and the total net is calculated, rounded to 2 decimals. In a step 3, the applicable VAT rate based on the user's country of residence at the time of invoicing is determined.

Next, in a step 4, the total VAT is calculated using the equation:

$$\text{round}(\text{total net} * \text{VAT rate}, 2) \quad \text{Eq. 4}$$

Subsequently, in a step 5 the total gross is calculated using the equation:

$$\text{round}(\text{total net} * (1 + \text{VAT rate}), 2) \quad \text{Eq. 5}$$

In a sixth step the payment and credits for the user are fetched from account table 216. The total amount is then calculated in a step 7 using the equation:

$$\text{round}(\text{total amount previous invoice} + \text{total gross payments} - \text{credits}, 2) \quad \text{Eq. 6}$$

In a step 8 the total net, VAT, and total amount are then written to the user's invoice.

In addition to listing fees, service fees are also assessed based on the selling price of an item. These fees are known as final value fees (FVF) and are calculated as follows. In general, when calculating the FVF, the FVF percentage is applied to the final price (winning bid or By it Now™-price) of the item, then the deduct VAT of the site of the listing is deducted; this result is rounded to 6 decimal digits and stored as the net amount. At invoice time, the VAT is assessed based on the rules for the user. The net FVF for a single item is calculated by:

$$\text{NET FVF} = \text{ROUND}[\text{Final Price} * \text{FVF-Rate} / (1 + \text{VAT-Rate of Site}), 6] \quad \text{Eq. 7}$$

For example:

NET FVF=Final Price EUR 10.00; FVF Rate 5.00% (incl. VAT-Rate 20%)

25 NET FVF=10.00*0.05/(1+0.2)=0.416666666 . . . round to=0.416667

For multiple item listings having the same price, the foregoing (Eq. 7) calculation is applied to each item. For Dutch auctions, the NET single item FVF (Eq. 7) is first calculated and then multiplied with the number of items sold (again rounding to 6 decimal digits). The result will be stored in account table 216 as a multi-item net FVF. The calculation is shown below:

$$\text{NET Dutch FVF} = \text{ROUND}[\text{ROUND}(\text{Final Price} * \text{FVF-Rate}; 6) * \text{Qty Sold}/(1 + \text{VAT-Rate of Site}); 6] \quad \text{Eq. 8}$$

For example:

NET Dutch FVF=Final Price EUR 10.50; 12 Items Sold, FVF Rate 5.00% (inc. VAT-Rate 19.6%)

NET Dutch FVF=11.20*0.05=0.560000 (rounded to 6 decimal digits, if required)

0.560000*12/(1+0.196)=5.618729096989 . . . round to≈5.618729

The general rule for display fees on SYI pages, is to display the actual gross amount for each user on EU-sites. Two decimal digits shall be displayed. For Non-EU sites there are no changes. The display rules are shown below in Table 2, wherein examples correspond to a user of eBay's German site.

TABLE 2

| Type of User | EU-Sites | |
|---|---|---|
| | Non-VAT Registered (Private) | VAT Registered |
| Local EU Resident [e.g. German Resident] | Actual Gross (= Local Gross), incl. local VAT [e.g. ebay.de Gross fee] | Actual Gross (= Local Gross), incl. local VAT [e.g. ebay.de Gross fee] |
| Foreign EU Resident [e.g. French Resident] | Actual Gross, incl. actual VAT [e.g. Local ebay.de Gross fee, adjusted by French VAT rate] | Actual Gross, incl. actual VAT [e.g. Local ebay.de Gross fee, adjusted by French VAT rate] |
| Non-EU Resident [e.g. USA Resident] | Net (= Actual Gross), incl. 0% VAT [e.g. Local ebay.de Gross fee, deducted by DE VAT rate] | n/a |

As discussed above EU residents are use to paying prices for goods and services that have the VAT already build into the price. Thus, individual listing, invoicing, and account balance information is displayed to EU users in a manner that doesn't explicitly indicate individual VAT assessments—rather the VAT assessments are rolled into the listed fees. However, a statement is provided indicating to the user that the fees include a VAT charge, identifying the rate and the EU country. For example, a portion of a typical SYI fee review page 500 showing listing fees for an exemplary item listing is shown in FIG. 5. A statement 502 indicates a VAT rate 504 (20%) is being assessed for residents of a country 506 (Germany). The displayed rate and country correspond to the user, rather than the site, and are thus generated dynamically based on the user's Country ID.

In addition to listing items for immediate (after confirmation) bid availability, users of network-based marketplace 102 may also set up listings for auctions or fixed priced sales that will occur at a future date. Accordingly, since the actual service (i.e., the listing of the item) will not be performed until the future point in time, the actual VAT assessment will likewise not take place until that time. Therefore, a note is provided to the user at the time of preparing the listing identifying that the actual listing fee charges will be determined at the time the listing goes into effect, as depicted by a note 602 on a portion of an SYI fee review page 600 in FIG. 6.

Another consideration relates to revising a listing. A common parameter that is revised is the price of an item. This creates an interesting situation with regard to VAT assessment. Since listing fees may depend on a listing price, a change in price may result in an increased or reduced listing fee. Additional charges (due to raising the start price) or partial credits (in case of lowering the start pricey, are handled by the network-based marketplace machine 102 through fully crediting the original charge and debiting the full new charge.

Regarding the VAT calculation, these credits will be handled in a manner similar to other item-related credits. Therefore, for revised credits, the "net" portion (i.e. excluding tax) of the fee based on the original fee charged at listing time of the item will be credited. The additional "tax" portion of the credit will be based on the current VAT-rate instead.

This process is illustrated in the flowchart of FIG. 7. The process begins in a block 700, wherein the item listing fees (i.e., insertion fees) are determined when an item is originally listed based on the net insertion fee and the VAT rate for the cycle corresponding to the original date. For example:

Original item listed on July 14:
        net insertion fee=$10
        tax rate based on cycle (July 15) covering July 14=2%
        VAT=$0.20
        total fee=$10.20

Next, in a block 702, a credit for the full net insertion fee based on the original listing date is provided. In addition, a VAT credit relating to the original net insertion fee amount is made. However, the VAT credit is based on the VAT rate for the cycle corresponding to the revision date rather than the original date. Continuing with the example;

Revise the item on July 18:
        net insertion fee credit (based on July 14)=$10
        tax rate based on cycle (August 15) covering July 18=3%
        VAT credit=$0.30
        total credit=$10.30

The process is completed in a block 704, wherein a new debit charge is incurred corresponding to the new net insertion fee plus the VAT. In this case, the VAT rate is based on the cycle corresponding to the revision date. Continuing with the example:

new net insertion fee (based on July 18)=$20
    tax rate based on cycle (August 15) covering July 18=3%
    VAT=$0.60
    total fee=$20.60

Relists, including bulk relists, are handled in a similar manner to revised items—that is, the credits and new debits reflect the VAT rate for the cycle corresponding to the date on which the relists occur.

In addition to including VAT rates in displayed listing fees, final value fees including built-in VAT charges are also shown to users. For example, an SYI listing fee page 800 shown in FIG. 8 contains an FVF fee section 802 delineating final value fees based on the final sale price. SYI listing fee page 800 also includes a note 804 indicating that the fees include a VAT rate for a corresponding country, as depicted by a VAT rate field 806 and a Country field 808. It is noted that when SYI listing fee page 800 is rendered, VAT rate field 806 and a Country field 808 will contain appropriate values for a current user.

The account status pages available to users vary dependent on whether the user is registered EU user. In short, non-EU users will be presented with account information that does not include any VAT-related data, while EU users will be provided with account information that includes VAT-related data.

A portion of an exemplary account status page 900 corresponding to an EU-registered user (non-exempt) is shown in FIG. 9. The account status page includes three VAT-related columns: a VAT rate column 902, a net amount column 904, and a gross amount column 906. The VAT rate column 902 lists the VAT rate charged for a given fee entry. Values in net amount column 902 correspond to the actual fee amount to which the VAT rate is applied for a given fee, while the values in gross amount column 906 reflect the total fee charged for the given fee entry.

By comparison, a portion of an exemplary account status page 1000 corresponding to a VAT-exempt EU-registered user is shown in FIG. 10. Notably, there are no debit charges shown in gross amount column 906, since the net and gross amounts are the same when no VAT is assessed. Also illustrated in the page is a credit entry 1002 for a VAT credit for the month of July. As described in further detail below, in response to a request to change a user's VAT status (entered by the user), there is a time period between the time of the request and the time of confirmation during which VAT is still assessed. Any assessed VAT accrued prior to confirmation of the user's VAT status is remitted to the user as a credit.

Both the Account Status and the Invoice requirements are specific to the user's country of registration (i.e., COUNTRY ID). Both sections do not follow the SITE ID logic. For example, the logic on the US site will be dependent on the country of residence of the user, resulting in different site behaviour between DE (German) and US users: US users will be treated as non-EU residents, with no changes vs. the current status quo; DE users will be treated as EU-residents with the behaviour for EU-residents defined herein.

A portion of an exemplary invoice page 1100 is shown in FIG. 11. Each invoice includes three sections: a header 1102, an invoice summary table 1104, and a detailed invoice section (not shown). The detailed invoice section contains information similar to that shown above with reference to the account balance pages of FIGS. 9 and 10, and, as before, the specific format of this section will reflect the VAT status of the user.

The header 1102 contains information specifically required by the EU authority for the site, such as a particular AG VAT identification number 1106, and a registration number 1106 issued to the on-line marketplace service. The header also includes user-specific information, such as name, address, account number, etc.

The invoice summary table 1104 shows summary information for fees, payments, and credits. In the illustrated example, the fees include both vatable fees 1106 (i.e., those fees for which VAT assessments are made), and non-vatable fees 1108.

Header and summary portions of an invoice page 1200 corresponding to an VAT-exempt EU user are shown in FIG. 12. In this instance, header 1102 will further contain a VAT identification number 1202 and a VAT status 1204. Further note that the invoice summary table 1104 for this type of invoice will not include any VAT entries since VAT is not assessed for VAT-exempt users.

The invoice summary table 1104 will include information calculated by an invoicing program based on the rules shown in the following table:

TABLE 3

| TYPE | DISPLAY AND CALCULATION RULES |
|---|---|
| Total Net Fees | Sum of all net debits for the billing period, rounded to 2 decimal digits |
| VAT-Rate | VAT-rate (in %) depending on country of residence at invoicing time, applicable for full cycle*), displayed in memo line. Do not show for VAT-exempt users. |
| VAT Amount | Total net multiplied with VAT-rate, rounded to 2 decimal digits, displayed in memo line. Do not show for VAT-exempt users. |
| Total Gross Fees | Total net for cycle plus VAT amount for cycle, rounded to 2 decimal digits Do not show for VAT-exempt users. |

TABLE 3-continued

| TYPE | DISPLAY AND CALCULATION RULES |
|---|---|
| Previous Amount Due | Pulled from EOM table |
| Payments and Credits | Sum of all Payments received during the billing cycle, plus sum of all credits received (incl. VAT where applicable), pulled from accounts table. |
| Current Total Balance | For private sellers: Total Gross for Cycle plus Previous Balance minus Payments & Credits For VAT-registered sellers Total Net for Cycle plus Previous Balance minus Payments & Credits Round to 2 decimal digits in either case. |
| Total Amount Due | Sum of Total Gross Fees, Previous Amount Due, Payments and Credits. |

VAT-Exemption Process

Figure 13:
FIG. 13 is a representation of a portion of an exemplary web page form via what a user can enter a VAT identification number.

The following section defines the process and the functionality by which VAT-registered users can obtain a VAT-exemption status, in order not to be charged VAT on services rendered by the on-line marketplace site. Generally, users are required to submit their European VAT-ID to the on-line marketplace. The on-line marketplace will the perform a validation check (e.g., via confirmation with an appropriate taxing authority) on the ID once received and then approve or deny the VAT-exempt status based on the outcome of the verification. In one embodiment, a VAT-exemption status request can be entered by logging into the on-line marketplace site and navigating to a VAT-exempt status request form 1300 and entering the VAT ID, as shown in FIG. 13. A pull-down control 1302 is provided to enable the user to select an appropriate country code for the VAT ID, which is entered in a text box 1306. Based on pre-defined identification number patterns for each EU country, a mask is employed to verify the entered VAT ID is of proper form for the country selected via pull-down control 1302. In one embodiment an initial verification check is performed by observing whether or not the country code selected for the request matches the registered country for the user. In a similar manner, users are enabled to update and delete VAT ID's via corresponding forms (not shown).

Information (i.e., status codes) corresponding to the VAT status for each user is stored in database 124. An exemplary set of status codes is shown below in Table 4. In one embodiment, the VAT-exempt status data is stored in user information table 210.

TABLE 4

| VAT-Exempt Status | Code |
|---|---|
| VAT-exemption not applied for | 0 |
| VAT-exemption pending approval (i.e. VAT-ID submitted) | 1 |
| VAT-exemption granted | 2 |
| VAT-exemption status denied | 3 |
| Active VAT-ID deleted by on-line marketplace site | −1 |
| Active VAT-ID deleted by user | −2 |

The moment the user receives the VAT-exempt status, the VAT amount charged applies for all full billing cycles for the period between initial VAT-ID submission and the VAT-exempt status approval (for that same VAT-ID, in case of submission of multiple IDs) is automatically credited in the user's account as a VAT-only credit. For this process, an aggregation of the VAT charged for the full billing cycles in question is performed, and a one-time VAT credit is issued, as illustrated above as VAT credit 1002 in FIG. 10.

Handling User Moves Between EU Countries

Due, in part, to the proximity between EU countries in combination with the large number of EU users, there are likely to be many instances in which users move from one EU country to another. Users may change their country of residence on any sites managed by the on-line marketplace service by updating the address of their user profile. Whenever a user changes his/her country of residence, a new VAT-rate is applicable for the user, unless the user is already VAT-exempt or changes his country of residence from Non-EU country to another Non-EU country. This creates additional tax considerations due to a likely change in the VAT rate, especially with respect to refunds for changes made to a particular listing before an after a move. However, for simplicity, whenever a change in the VAT-rates occurs due to a user's moving to a new country, the billing system will apply the VAT-rate at time of the invoicing run. If the user changes his country of residence to a higher VAT-rate he will be charged the higher VAT rate for all transactions in that billing cycle (including transactions before the date of change).

An exemplary use case illustrating a scenario where a user changes residence from Germany to France is shown in FIG. 14. In a first step on January 3, the user (i.e. Seller) lists an item for auction, and is charged an insertion fee of €0.50 (Net), which is recorded in account table 216. In a second step on January 10, the end of auction (EOA) occurs, with an unsuccessful result (no winning bid). On January 12, the Seller than revises the listing in accordance with a third step, incurring another insertion Fee of €0.50 (Net). On January 15, during a fourth step an invoice is created using the VAT rate for the Seller's residence (Germany) on that date. The resulting invoice includes:

Total Net=€−1.00

VAT (16%)=€−0.16 [German Tax liability]

Total Due=€−1.16

At step 5 on January 20, the second auction ends successfully. The insertion fee recorded in step 3, €0.50, is credited. At a final step 6, a new invoice is generated on February 15, this time using the VAT rate for the Seller's new residence (France). This yields the following result.

Total Net=€0.50

VAT (19.6%)=€0.10 [French Tax Liability]

Total Due €=0.60

It is noted that VAT is still calculated on negative totals for consistency.

To enable detection of potential tax fraud resulting from a user changing his country of residence and changing it back afterwards (e.g. with respect to a large fee transaction or set of transactions), following data are tracked (via storage in user audit table 306) and passed on to data warehouse 310.

Date of change (of country of residence)

Initial Country ID (before change)

New country ID (after change)

Given these data, the user's changes between different countries can be tracked for tax fraud purposes.

Reporting to Tax Authorities and Collected VAT Distribution

Collected VAT and VAT activities are reported to an appropriate tax authority on a periodic basis, which in one instance is quarterly. The reporting should provide sufficient information for internal accounting purposes as well as for tax return submissions to each EU member state. In one embodiment, a single report for all countries is submitted to one local EU tax authority, with country-specific information provided for each EU member state.

The quarterly return shall be made in Euro. If fees have been charged in other currencies, a currency conversion is performed, wherein the valid exchange rate is for the last date of the reporting period. The exchange is done following the exchange rates published by the European Central Bank for the day in question (or, if there is no publication on that day, on the next day of publication).

Figure 15:
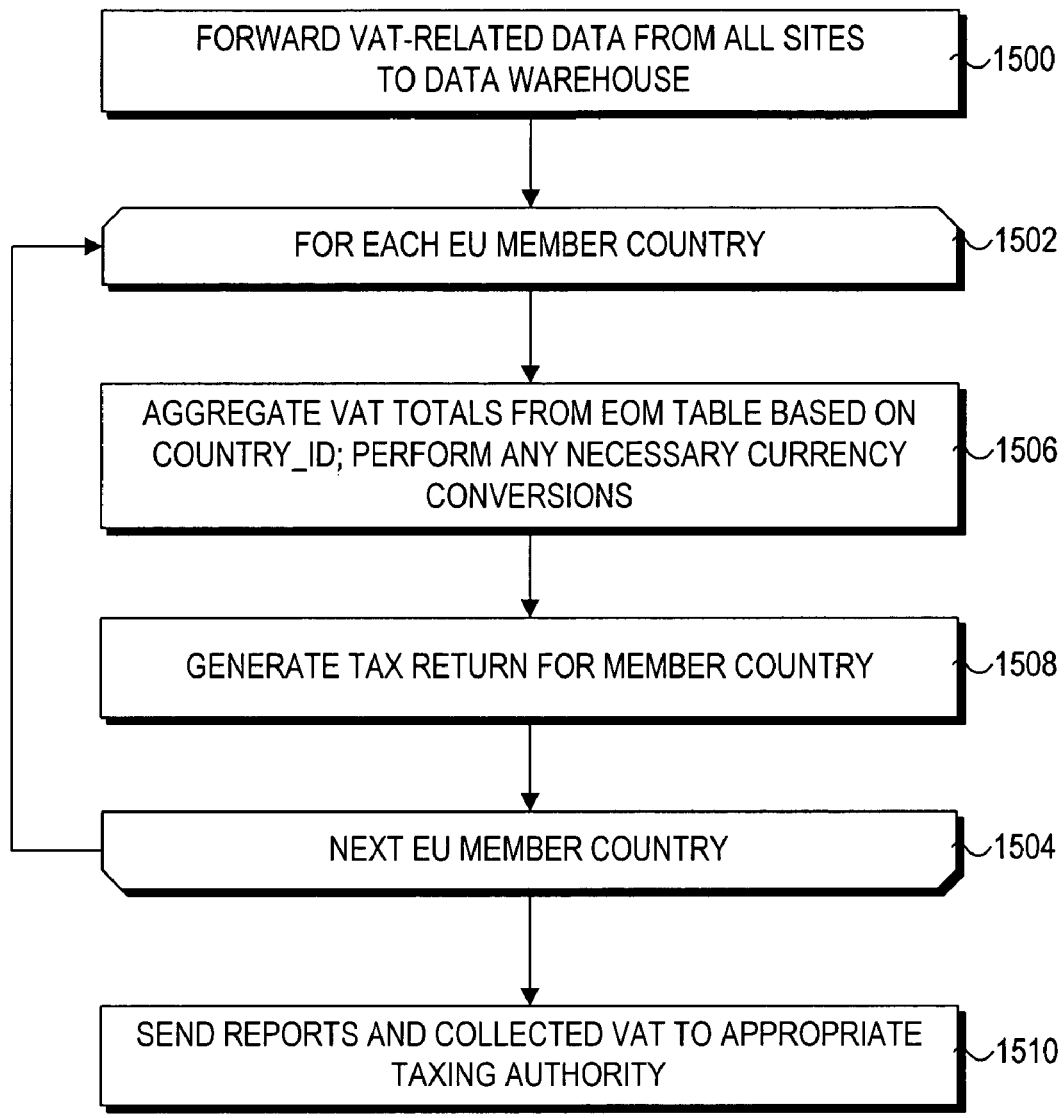
FIG. 15 is a flowchart illustrating operations performed to generate VAT tax returns and distributed collected VAT to appropriate taxing authorities.
Figure 16:
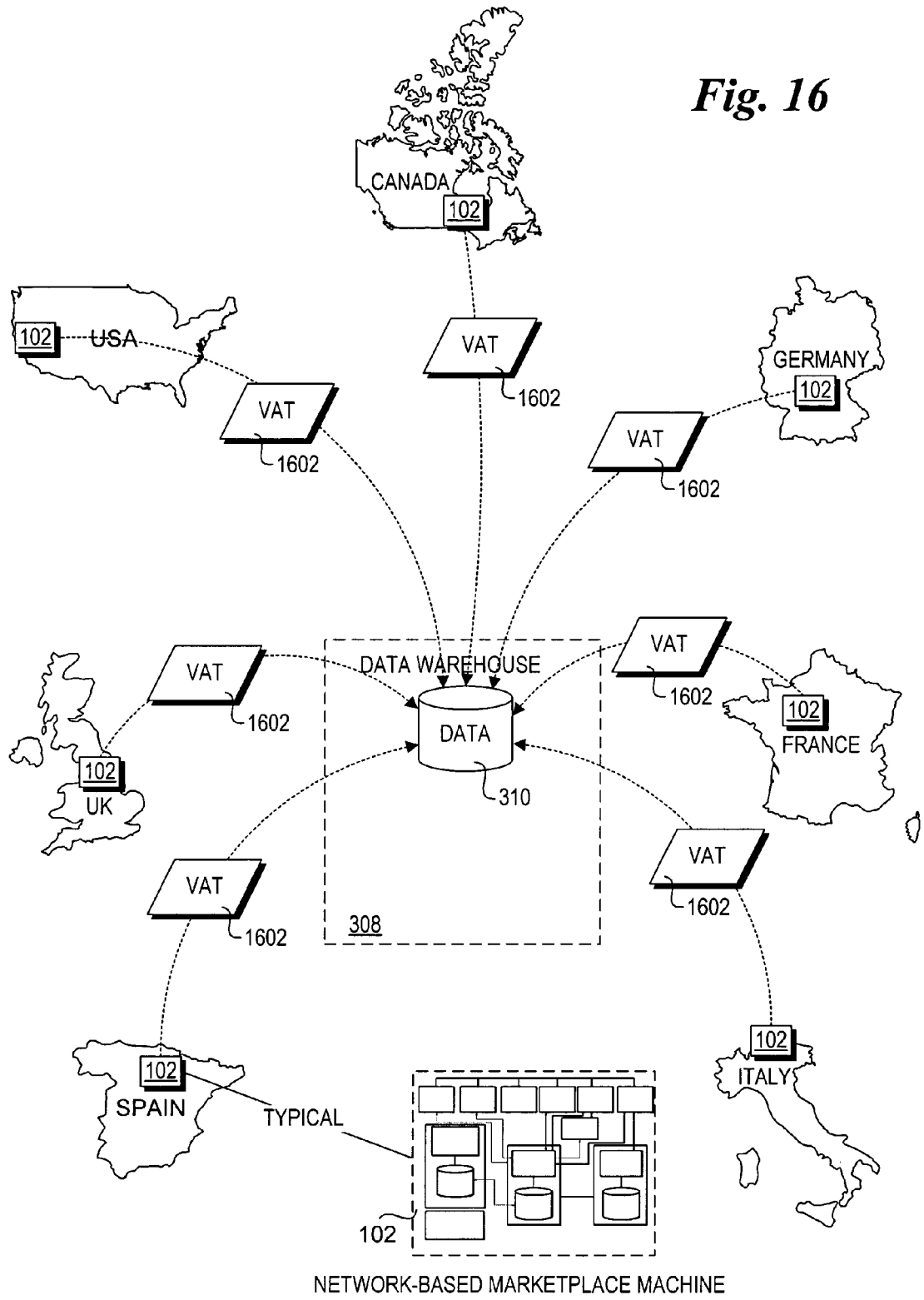
FIG. 16 is a schematic diagram illustrating VAT-related data generated on various on-line marketplace sites in Europe, the United States, and Canada that are sent to a data warehouse and processed to generate VAT reports.
Figure 17:
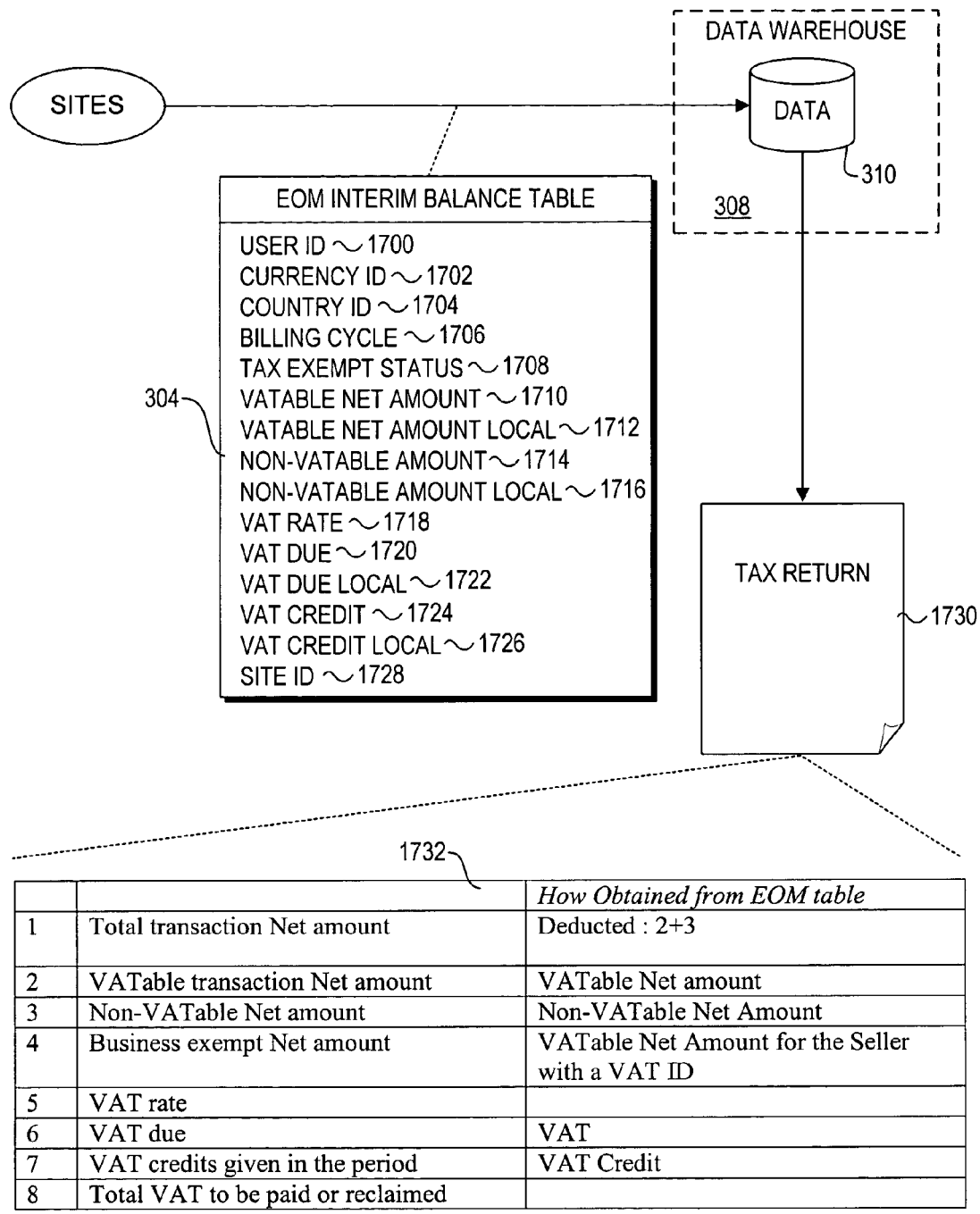
FIG. 17 is a schematic diagram illustrating aspect of the VAT report-generation process, including details of an EOM interim balance table containing VAT-related data that is processed to generate the VAT reports.

From a tax perspective, the following information is to be filed for each return:

Total Net amount by jurisdiction
VATable Net amount by jurisdiction
Non-VATable Net amount by jurisdiction with a break out for Business exempt revenue
VAT charged for the period
VAT credits given in the period With reference to the flowchart of FIG. 15, and FIGS. 16 and 17, a tax reporting processes in accordance with one embodiment is performed in the following manner. In a block 1500, all VAT-related data 1602 is forwarded from each site operated by the on-line marketplace service, such as depicted in FIG. 16, wherein respective network-based marketplace machines 102 operating in the United States (USA), Canada, Germany, France, Italy, Spain, and the United Kingdom (UK) forward respective instances of VAT-related data 1602 to data warehouse 308 to be stored in database 310.

In one embodiment, the pertinent VAT-related data is stored in EOM interim balance table 304. An exemplary set of VAT-related columns corresponding to interim balance table 304 is shown in FIG. 17. These columns include a USER ID column 1700 which is used to link to other tables in database 124 for corresponding primary key-foreign key relationships. A CURRENCY ID column 1702 contains a code that identifies the currency employed by the user (e.g., Pounds, Francs, Euros, etc.). The user's country of residence is identified by a COUNTRY ID column 1704.

Information indicating whether or not a user is (VAT) tax-exempt is contained in a TAX EXEMPT STATUS column 1708. Total and local net VATable amounts are respectively stored in VATABLE NET AMOUNT and VATABLE NET AMOUNT LOCAL columns 1710 and 1712. Total and local net non-VATable amounts are respectively stored in NON-VATABLE NET AMOUNT and NON-VATABLE NET AMOUNT LOCAL columns 1714 and 1716. Applicable VAT rates for a given billing cycle are stored in a VAT RATE column 1718.

The total VAT due is stored in a VAT DUE column 1720, while a local VAT due is stored in a VAT DUE LOCAL column 1722. Total and local VAT credits are respectively stored in VAT CREDIT column 1724 and 1726. Finally, a code identifying each site corresponding to a respective user is stored in a SITE_ID column 1728.

As indicated by start and end blocks 1502 and 1504, operations contained in blocks 1506, and 1508 are performed for each EU member state (i.e., country). First, in block 1506, data contained in EOM interim balance table 304 are aggregated based on COUNTRY ID. At the same time (or prior thereto), any necessary currency conversions are performed. In a block 1508, a tax return 1700 is generated for the currently-processed EU member country. Details of how various VAT data are obtained for tax return 1700 are shown in a table 1702.

In general, individual tax returns and collected VAT may be returned to an appropriate taxing authority for each EU member. Optionally, as depicted in a block 1510, all of the reports and collect VAT may be sent to a single taxing authority. As discussed above, in this instance the currency will be Euros.

Exemplary Computer Server System

Figure 18:
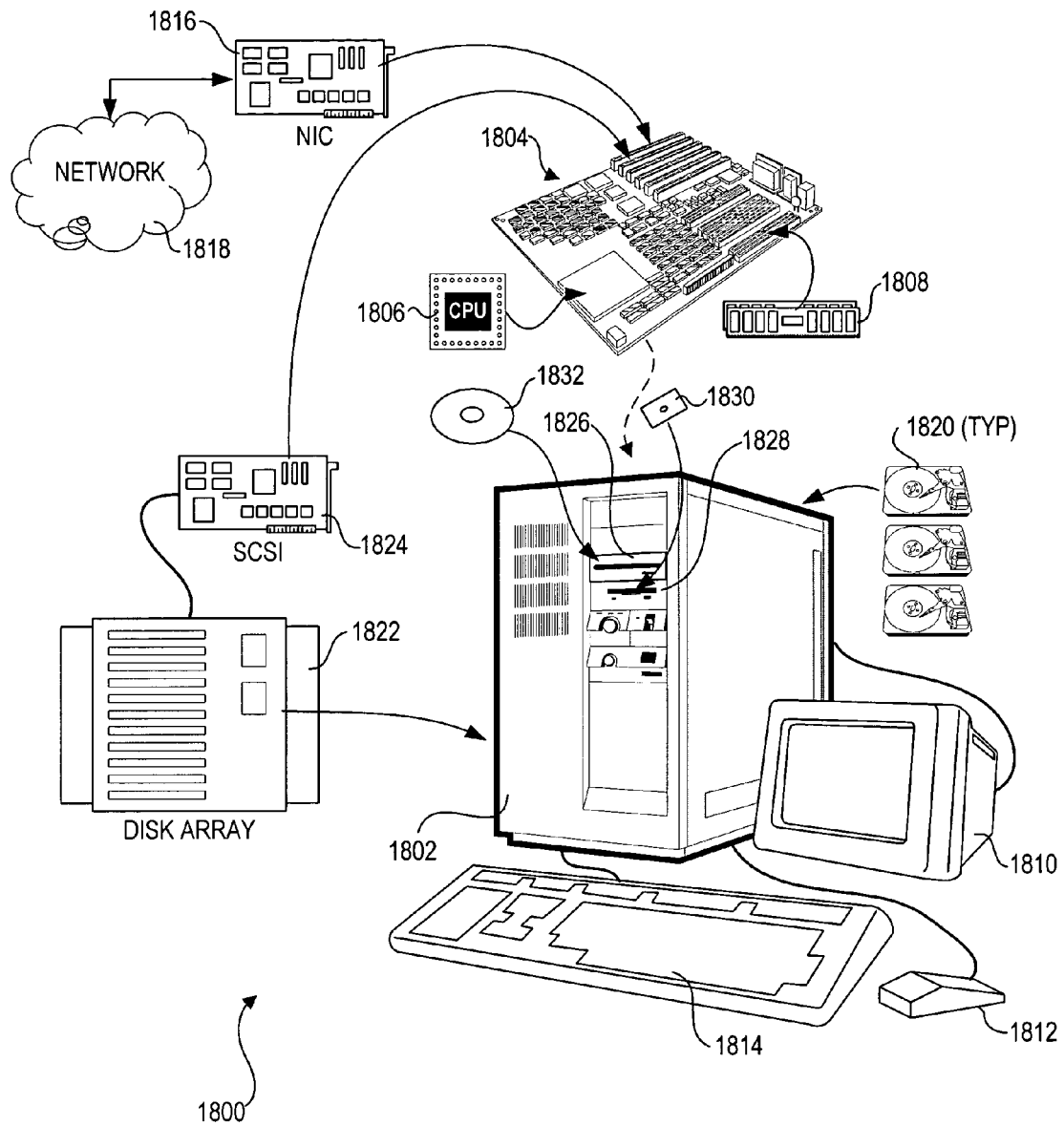
FIG. 18 is a schematic diagram illustrating components of an exemplary computer server that may be employed to execute various software components to implement the method operations disclosed herein.

With reference to FIG. 18, a generally conventional computer server 1800 is illustrated, which is suitable for use in connection with practicing embodiments of the present invention. For example, computer server 1800 may be used for running the various software applications, modules, and components discussed above, such as those employed by network-based marketplace machine 102. Typically, a plurality of computer servers 1800 may be employed in a well-known N-tier configuration, including front-end web servers, back-end database servers, and middle-tier application servers. Examples of computer systems that may be suitable for these purposes include stand-alone and enterprise-class servers operating UNIX-based and LINUX-based operating systems, as well as servers running the Windows NT or Windows 2000 Server operating systems.

Computer server 1800 includes a chassis 1802 in which is mounted a motherboard 1804 populated with appropriate integrated circuits, including one or more processors 1806 and memory (e.g., DIMMs or SIMMs) 1808, as is generally well known to those of ordinary skill in the art. The circuitry and components contained in chassis 1802 are powered one or more power supplied (not shown). A monitor 1810 may be provided for displaying graphics and text generated by software programs and program modules that are run by the computer server. A mouse 1812 (or other pointing device) may be connected to a serial port (or to a bus port or USB port) on the rear of chassis 1802, and signals from mouse 1812 are conveyed to the motherboard to control a cursor on the display and to select text, menu options, and graphic components displayed on monitor 1810 by software programs and modules executing on the computer. In addition, a keyboard 1814 is coupled to the motherboard for user entry of text and commands that affect the running of software programs executing on the computer. Computer server 1800 also includes a network interface card (NIC) 1816, or equivalent circuitry built into the motherboard to enable the server to send and receive data via a network 1818.

File system storage may be implemented via a plurality of hard disks 1820 that are stored internally within chassis 1802, and/or via a plurality of hard disks that are stored in an external disk array 1822 that may be accessed via a SCSI card 1824 or equivalent SCSI circuitry built into the motherboard. Optionally, disk array 1822 may be accessed using a Fibre Channel link using an appropriate Fibre Channel interface card (not shown) or built-in circuitry, or a NAS storage array may be employed.

Computer server 1800 generally may include a compact disk-read only memory (CD-ROM) drive 1826 into which a CD-ROM disk may be inserted so that executable files and data on the disk can be read for transfer into memory 1808 and/or into storage on hard disk 1820. Similarly, a floppy drive 1828 may be provided for such purposes. Other mass memory storage devices such as an optical recorded medium or DVD drive may also be included. The machine instructions comprising the software components that cause processor(s) 1806 to implement the operations of the present invention that have been discussed above will typically be distributed on floppy disks 1830 or CD-ROMs 1832 (or other memory media) and stored in one or more hard disks 1820 until loaded into memory 1808 for execution by processor(s) 1806. Optionally, the machine instructions may be loaded via network 1818 as a carrier wave file.

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
    enabling at least one user of one or more users of the network-based marketplace having residences in countries requiring a value-added tax (VAT) to be charged to provide a VAT identifier, the VAT identifier indicating a VAT-exempt status of the at least one user;
    identifying a first point in time at which a request for a VAT-exempt status is received, the request comprising a country code and the VAT identifier;
    performing an initial verification check to determine that the country code matches a country of residence for the at least one user;
    confirming, at a second point in time, the VAT identifier of the at least one user is associated with the VAT-exempt status;
    recording VAT assessments on services rendered for the at least one user between the first point in time and the second point in time;
    selectively assessing, using one or more processors, the VAT to each of the one or more users of the network-based marketplace, the assessing based on the VAT identifier and the country of residence of each of the one or more users requiring the VAT for the services rendered;
    crediting at least one user for any VAT assessments that accrued between the first and second points in time;
    providing on-line account information to non-exempt and VAT-exempt users of the network-based marketplace service, the on-line account information for non-exempt users identifying VAT assessments for corresponding account entries;
    aggregating the VAT assessed to each of the one or more users by countries of residence; and
    generating a VAT report for each of the countries of residence based on the aggregated VATs.

2. The method of claim 1, wherein the assessing of each of the one or more users of the network-based marketplace the VAT comprises:
    for each of the one or more users:
        determining if the user is a resident of a country for which the VAT is not applicable; and
        not assessing the VAT for services provided to the user if the user is a resident of a country for which the VAT is not applicable.

3. The method of claim 2, further comprising:
    for each of the one or more users who is a resident of a country for which the VAT is applicable,
    not assessing the VAT for services provided to the user if the user has a VAT-exempt status.

4. The method of claim 3, wherein assessing each of the one or more users of the network-based marketplace the VAT comprises:
    for each of the one or more users who is a resident of a country for which the VAT is applicable and for which the user does not have a VAT-exempt status:
        determining a current VAT rate for the country of residence for the user;
        determining service fees for the user;
        determining a VAT assessment for the service fees based on the current VAT rate for the country of residence of the user.

5. The method of claim 4, further comprising providing service fee information to each user for a given transaction, the service fee information containing service fees with built-in VAT assessments.

6. The method of claim 4, wherein the service fees include a debit fee occurring during a first billing cycle and a related credit fee occurring during a second billing cycle; and wherein the VAT assessment includes:
    assessing a VAT on the debit fee using a VAT assessment rate applicable for the first billing cycle; and
    assessing a VAT as a credit on the credit fee using a VAT assessment rate applicable for the second billing cycle.

7. The method of claim 1, further comprising:
    exempting each VAT-exempt user from assessment of the VAT for future services provided to the VAT-exempt user.

8. The method of claim 1, further comprising providing account invoices to both non-exempt and VAT-exempt users of the network-based marketplace service, the account invoices for non-exempt users identifying VAT assessments for corresponding invoice entries.

9. The method of claim 1, further comprising tracking each user's registered country of residence over time to identify potential fraudulent user activities.

10. The method of claim 1, wherein the network-based marketplace services are hosted on a plurality of Internet sites, each corresponding to a respective country or region.

11. The method of claim 10, wherein VAT reports are generated by performing operations including:
    storing service transaction data for one or more users of a given Internet site on a database hosted by that site;
    forwarding service transaction data from the databases hosted by each of the plurality of Internet sites to a central data repository; and
    aggregating the service transaction data forwarded to the central data repository to generate the VAT return reports.

12. The method of claim 1, further comprising dynamically generating web pages via which each user can interact with the network-based marketplace, wherein the web pages generated for a given user differ based on a VAT status of that specific user.

13. A system, comprising:
a computer memory having stored therein:
front-end modules configured to
generate markup language pages via which one or more users may be provided with network-based marketplace services,
provide on-line service fee information to non-exempt and VAT-exempt users of the network-based marketplace service, the on-line service fee information for non-exempt users identifying any value-added tax (VAT) assessments, and
enable the one or more users to provide a VAT identifier, the VAT identifier indicating a VAT-exempt status of a user;
a VAT assessment module configured to:
identify a first point in time at which a request for a VAT-exempt status is received, the request comprising a country code and the VAT identifier,
perform an initial verification check to determine that the country code matches a country of residence for the at least one user,
confirm, at a second point in time, that the VAT identifier of the user is associated with the VAT-exempt status,
record VAT assessments on services rendered for the at least one user between the first point in time and the second point in time,
selectively assess the VAT for the network-based marketplace services to the one or more users, the assessing based on the VAT identifier and the country of residence of each of the one or more users requiring the VAT for the services rendered, and
credit at least one user for any VAT assessments that accrued between the first and second points in time;
a database interface module configured to interface with a database to store and retrieve data related to VAT assessments made by the VAT assessment software component; and
a reporting module configured to generate respective VAT reports for each country for which VAT is assessed via aggregation of data stored in the database.

14. The system of claim 13, wherein the VAT assessment module assesses the VAT for each user who is a resident of a country for which the VAT is applicable and for which the user does not have a VAT-exempt status by performing operations including
determining a current VAT rate for the country of residence for the user;
determining service fees for the user;
determining a VAT assessment for the service fees based on the current VAT rate for the country of residence of the user.

15. The system of claim 13, wherein the front-end modules are to perform the further operation of generating a markup language page to provide account status information to a user, the account status information including data identifying VAT assessments for services provided via the network-based marketplace service.

16. The system of claim 13, wherein:
the VAT assessment module is to determine a VAT status of a user; and
the front-end modules are to dynamically generate markup language pages via which a user can access the network-based marketplace server based on the VAT status of the user, wherein different markup language pages are generated for users having different VAT statuses.

17. A machine readable medium including instructions that, when performed by a computer, cause the computer to:
enable at least one user of one or more users of the network-based marketplace having residences in countries requiring a value-added tax (VAT) to be charged to provide a VAT identifier, the VAT identifier indicating a VAT-exempt status of the at least one user;
identify a first point in time at which a request for a VAT-exempt status is received, the request comprising a country code and the VAT identifier;
perform an initial verification check to determine that the country code matches a country of residence for the at least one user;
confirm, at a second point in time, the VAT identifier of the at least one user is associated with a VAT-exempt status;
record VAT assessments on services rendered for the at least one user between the first point in time and the second point in time;
selectively assess the VAT to each of the one or more users of the network-based marketplace, the assessing based on the VAT identifier and the country of residence of each of the one or more users requiring the VAT to be charged for services rendered;
credit at least one user for any VAT assessments that accrued between the first and second points in time;
provide on-line account information to non-exempt and VAT-exempt users of the network-based marketplace service, the on-line account information for non-exempt users identifying VAT assessments for corresponding account entries;
aggregate the VAT assessed to each of the one or more users by their countries of residence; and
generate a VAT report for each of the countries of residence based on the aggregated VATs.

18. A system comprising:
means for generating markup language pages via which one or more users may be provided with network-based marketplace services;
means for enabling at least one user of the one or more users of the network-based marketplace having residences in countries requiring a value-added tax (VAT) to be charged to provide a VAT identifier, the VAT identifier indicating a VAT-exempt status of the at least one user;
means for identifying a first point in time at which a request for a VAT-exempt status is received, the request comprising a country code and the VAT identifier;
means for performing an initial verification check to determine that the country code matches a country of residence for the at least one user;
means for confirming, at a second point in time, the VAT identifier of the at least one user is associated with the VAT-exempt status;
means for recording VAT assessments on services rendered for the at least one user between the first point in time and the second point in time;
VAT assessment means for assessing the VAT to each of the one or more users, the assessing based on the VAT identifier and a VAT rate of the country of residence of each of the one or more users requiring the VAT for services rendered;
means for crediting at least one user for any VAT assessments that accrued between the first and second points in time;
means for providing on-line invoice information to non-exempt and VAT-exempt users of the network-based marketplace service, the on-line invoice information for non-exempt users identifying any VAT assessments for the user;

means for interfacing with a database to store and retrieve data related to VAT assessments made by the VAT assessment means; and reporting means for generating respective VAT reports for each country for which VAT is assessed via aggregation of data stored in the database.

19. The system of claim 18, wherein the means for generating markup language pages generates user-specific markup language pages that differ dependent on a VAT status of a user of the network-based marketplace services.

20. The system of claim 18, further comprising a means for generating on-line account status data corresponding to a user's account with the network-based marketplace service, the account status data identifying VAT assessments for the user.

21. The system of claim 18, further comprising a means for warehousing VAT assessment data collected from a plurality of on-line sites hosted by the network-based marketplace service.

22. The system of claim 18, further comprising a means for detecting fraudulent user activity involving avoidance of being assessed VAT on services provided by the network-based marketplace service.

23. The method of claim 1, wherein the confirming of the VAT identifier comprises employing a mask to verify the provided VAT identifier based on pre-defined identification number patterns.

24. The method of claim 1, wherein the confirming of the VAT identifier comprises determining that a country code selected by the at least one user matches a registered country for the user.

25. The method of claim 1, wherein the confirming of the VAT identifier comprises validating the VAT identifier with a taxing authority, the taxing authority identified based on a registered country of the user.

26. The method of claim 1, further comprising storing the VAT identifier in a user information table.

27. The method of claim 1, further comprising assigning a VAT exempt status code to the user based on the confirming of the VAT identifier.

\* \* \* \* \*

UNITED STATES PATENT AND TRADEMARK OFFICE
CERTIFICATE OF CORRECTION

| | | |
|---|---|---|
| PATENT NO. | : 7,827,079 B2 | Page 1 of 1 |
| APPLICATION NO. | : 10/610125 | |
| DATED | : November 2, 2010 | |
| INVENTOR(S) | : Yuliya Feldman et al. | |

It is certified that error appears in the above-identified patent and that said Letters Patent is hereby corrected as shown below:

In column 2, line 35, delete "user" and insert -- user; --, therefor.

In column 4, line 34, delete "block" and insert -- block. --, therefor.

In column 8, line 67, delete "pricey" and insert -- price), --, therefor.

In column 11, line 26, delete "will the" and insert -- will --, therefor.

In column 12, line 17, delete "an" and insert -- and --, therefor.

In column 17, line 3, in Claim 13, delete "to" and insert -- to: --, therefor.

Signed and Sealed this
Fifteenth Day of March, 2011

David J. Kappos
*Director of the United States Patent and Trademark Office*